United States Patent
Barker

(10) Patent No.: US 7,658,417 B2
(45) Date of Patent: Feb. 9, 2010

(54) HOSE HINGE ASSEMBLY

(75) Inventor: David N Barker, San Diego, CA (US)

(73) Assignee: Apical Industries, Inc., Oceanside, CA (US)

( * ) Notice: Subject to any disclaimer, the term of this patent is extended or adjusted under 35 U.S.C. 154(b) by 419 days.

(21) Appl. No.: 11/641,993

(22) Filed: Dec. 18, 2006

(65) Prior Publication Data

US 2008/0012305 A1 Jan. 17, 2008

Related U.S. Application Data

(60) Provisional application No. 60/776,545, filed on Feb. 24, 2006.

(51) Int. Cl.
*F16L 27/00* (2006.01)
*B64C 1/14* (2006.01)

(52) U.S. Cl. .............. 285/147.1; 285/148.4; 285/179; 285/275; 244/129.5

(58) Field of Classification Search .............. 285/179, 285/190, 272–282, 354, 147.1, 148.4
See application file for complete search history.

(56) References Cited

U.S. PATENT DOCUMENTS

| | | | |
|---|---|---|---|
| 1,776,865 A | 9/1930 | Salisbury | |
| 2,264,321 A | 12/1941 | Manson | |
| 2,391,266 A * | 12/1945 | Parker | 285/116 |
| 2,948,306 A * | 8/1960 | Kuraeff | 141/231 |
| 3,285,631 A * | 11/1966 | Stolpmann | 285/354 |
| 3,910,532 A | 10/1975 | Fischer | |
| 4,185,841 A | 1/1980 | Brundage | |
| 4,779,638 A | 10/1988 | Nitzberg et al. | |
| 4,827,961 A | 5/1989 | Nitzberg et al. | |
| 4,865,358 A * | 9/1989 | Jokinen | 285/64 |
| 5,334,064 A | 8/1994 | Ketterman et al. | |
| 5,586,615 A | 12/1996 | Hammer et al. | |
| 6,195,941 B1 | 3/2001 | Burow et al. | |
| 6,595,555 B2 | 7/2003 | Ungchusri et al. | |
| 6,709,019 B2 | 3/2004 | Parrott et al. | |
| 6,877,698 B2 | 4/2005 | Baker et al. | |
| 2006/0055171 A1 | 3/2006 | Parrott | |
| 2007/0202759 A1 * | 8/2007 | Bermal | 441/42 |

* cited by examiner

*Primary Examiner*—James M Hewitt
*Assistant Examiner*—Jay R Ripley
(74) *Attorney, Agent, or Firm*—Peter K. Hahn; Luce, Forward, Hamilton & Scripps, LLP

(57) ABSTRACT

A high-pressure hose hinge assembly provides a continuous fluid path between first and second components that move relative to each other. The hose hinge assembly includes a plurality of rotatable swivel fittings that couple a plurality rigid pipe sections. A first swivel fitting is fixedly coupled to the first component and another swivel fitting is coupled to the second component. At least one swivel fitting and two rigid pipe sections extend between the swivel fittings coupled to the first and second components to provide a continuous fluid path.

15 Claims, 5 Drawing Sheets

HOSE HINGE ASSEMBLY

CROSS-REFERENCE TO RELATED APPLICATIONS

This application claims priority to U.S. Provisional Patent Application Ser. No. 60/776,545, filed Feb. 24, 2006, which is hereby incorporated in its entirety by reference herein.

FIELD OF THE INVENTION

The present invention is generally directed to high pressure hose systems. More specifically, the present invention relates to a high pressure hose assembly that is hinged.

BACKGROUND OF THE INVENTION

Emergency flotation devices are required on many aircraft to provide emergency assistance to passengers in the event the aircraft experiences an emergency situation and is forced down in water. Emergency flotation devices generally include systems designed to float the aircraft, systems for emergency life rafts and life vests for individual occupants.

One example of an airplane flotation system is shown in U.S. Pat. No. 1,776,865. The system includes inflatable bags located in a forward portion of an airplane and is manually operated by a pilot. The bags are folded and stored in a non-inflated state within closed compartments that are dedicated to storage of the bags. The system utilizes pressure cylinders to sequentially unlock doors of the compartments and inflate the inflatable bags. During operation the pilot activates the pressure cylinder by releasing pressurized gas. After inflation, the pilot is required to pull a cord that places the pressure cylinder into an intermediate position to block further fluid flow between the pressurized fluid. A first disadvantage of the system is that it requires the bags to be folded and stowed directly in the compartments. As a result, inspection of the system would require removal of the bags from the compartment and re-stowing or replacement of the bags would require significant time so that the bags could be folded and stowed. Another disadvantage is that the pressure cylinders are located within the airplane fuselage such that they are not readily accessible. As a result, inspection, repair and/or replacement of those components is difficult. A still further disadvantage is that it requires manual operation by the pilot even after the initial activation of the system.

U.S. Pat. No. 2,264,321 to Manson, describes a life-saving device that includes an inflatable life raft that is stowed directly in a compartment dedicated to the life raft on the side of a vehicle such as an airplane. The compartment is closed by a pair of hinged doors that are spring-loaded to urge them into an opened position. The doors are held closed by pins that extend through meshing lugs that are included on the doors. A pull cord is secured to the pins and a valve on an inflating-gas container so that pulling on the cord sequentially removes the pins from the lugs and operates the valve to permit the flow of gas from the container to the raft. The cord fully disengages from the gas container after the valve is operated. A first disadvantage of the system is that it requires the life raft to be folded and stowed directly into a dedicated compartment. As a result, inspection and/or replacement of the life raft may be difficult. Another disadvantage of the system is that the pins may be disengaged without a complete activation of the system. In addition, the pull cord may become bound which may result in the pin disengaging without activation of the gas container. A further disadvantage is that the gas container valve does not include a mechanism to close the gas path between the gas container and the raft after the raft is inflated.

An additional disadvantage of the systems described above is that in order to retrofit an aircraft with such a system a compartment, such as a baggage compartment, would have to be converted and dedicated to the floatation system. As a result, storage space would be significantly reduced.

In view of the above, there exists a need for an emergency floatation system that may be mounted to a portion of the plane that is easily accessible. There is also a need for a system that can be installed during original manufacture of the aircraft, or as an aftermarket improvement. It is important that the system provide little or no impairment of the standard equipment and components of the aircraft.

SUMMARY OF THE INVENTION

The present invention provides an emergency floatation system that includes a high-pressure hose hinge assembly that allows a portion of the emergency floatation system to be mounted to components that are hinged with respect to each other. In particular, the floats and valves may be coupled to a hinged compartment door of an aircraft while a pressurized fluid source is mounted inside the aircraft. The hose hinge assembly provides reliable fluid communication between the hinged parts which allows easy access to the system for inspection and/or replacement.

The hose hinge assembly is especially useful for providing a high pressure connection between two components that are required to move relative to each other. In particular, the pipe hinge assembly is particularly well-suited to high pressure fluid lines that must pass between two components that are hinged together. For example, the hose hinge assembly according to the present invention is ideally suited for connecting a high pressure line that extends between an aircraft fuselage and a hinged door, such as a baggage compartment door, on the aircraft.

The present invention allows high pressure lines to extend between hinged components without requiring flexible tubing which may be more susceptible to bending fatigue, kinking and pinching. The present invention also allows the door to be opened without the need to disconnect the high pressure line and with minimal risk of failure due to bending and cycling when the door opens and closes.

According to an aspect of the present invention a high pressure pipe system allows operators to transfer gas from a fixed source to a movable component without compromising the original function of the moving component. This hinging pipe system can be used in connection with a baggage door life raft kit to inflate a life raft which is mounted in a pod on the inside of each baggage door which allows the baggage compartment to continue to be used for baggage without putting the integrity of the life raft system at risk.

During inflation of the life raft, gas is discharged from a remotely mounted reservoir and transferred via a series of inflation pipes, or hoses, to each baggage compartment door via the hose hinge assembly and then to the life raft pods. The hose hinge assembly would be the final connection point from the baggage compartment to the compartment door and the hinging mechanism allows the door to open without having to disconnect any pipes or hoses.

In an embodiment, the hose hinge assembly of the present invention generally includes three rotatable swivel fittings and two rigid pipe sections extending therebetween. In particular, the hose hinge assembly includes a first swivel fitting that is coupled to a first portion of a high pressure line that is fixedly attached to a first component, e.g., the interior of an aircraft fuselage such as a baggage compartment. A first rigid pipe, or hard line, is also coupled to the first swivel fitting so the first rigid pipe and the portion of the high pressure line attached to the first component rotate relative to each other. A second swivel fitting is connected to the first rigid pipe section opposite the first swivel fitting and a second rigid pipe section so that the first and second rigid pipe sections rotate relative to each other. A third swivel fitting is coupled to the second rigid pipe section opposite the second swivel fitting and a second portion of the high pressure line that is fixedly attached to a second component, e.g., a baggage compartment door, so that the second rigid pipe section and second portion of the high pressure line rotate relative to each other. It should be appreciated that as used herein the terms "hose" and "pipe" are used interchangeably and neither is intended to be limited to either flexible or rigid members.

According to an aspect of the present invention, the swivel fittings are two 90-degree elbows connected by a rotating joint. The swivel fittings and rigid pipe sections define interior conduits and thereby provide a high pressure fluid path between the first and second portions of the high pressure line. The swivel fittings allow the door to be moved relative to the aircraft, without the pipe being subject to fatigue, kinking or wear.

The present invention provides many advantages over known systems. For example, the present invention allows the operator to attach an inflatable component (a float or life raft), or a hydraulic component, across an existing moving joint between components of a device without altering the original function of the moving component. Additionally, the hose hinge assembly replaces a flexible hose which is susceptible to pinching, kinking and binding. Another advantage is that high pressure line extending across the moving joint do not need to be removed to operate the joint. For example, where one end is coupled to a compartment and the other end is coupled to the compartment door, the line does not require disconnection in order to open the door. In addition, because rigid tubing is utilized, less maintenance is required due to the inherent reliability of the rigid pipe as compared to flexible piping.

DETAILED DESCRIPTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

Figure 1A:
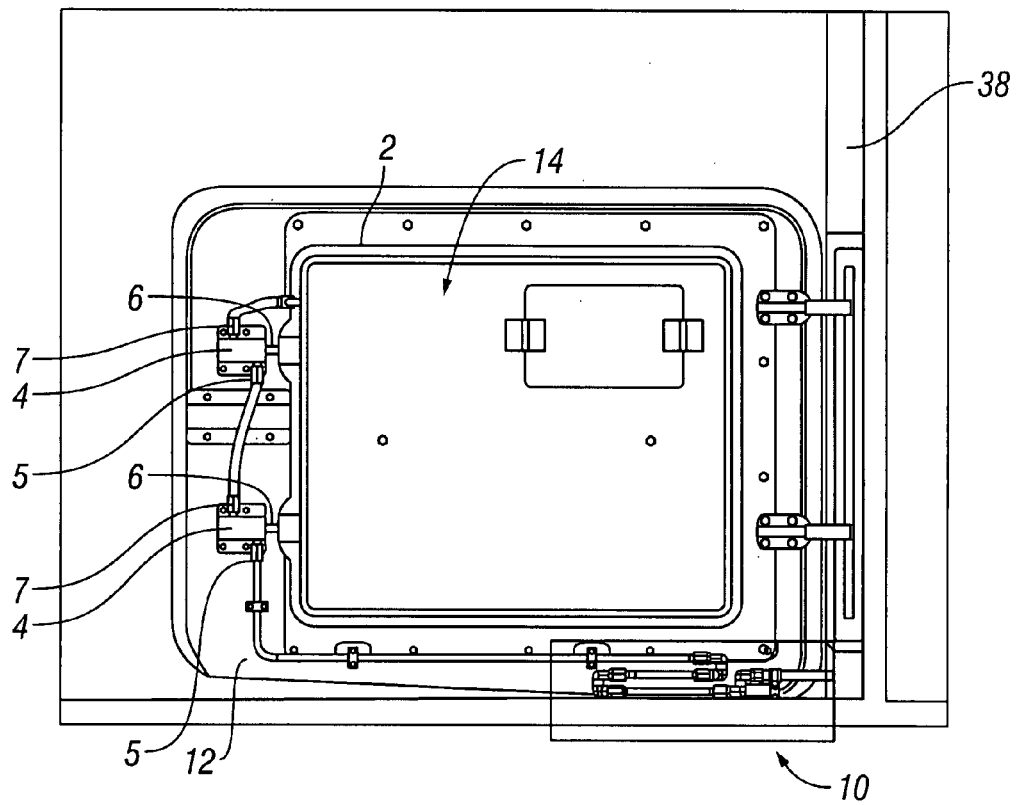
FIG. 1a is a rear view of the interior of an aircraft baggage compartment door in a closed position and a portion of the surrounding aircraft body panel.

Referring initially to FIGS. 1a-d, the hose hinge assembly 10 is shown. Hose hinge assembly 10 is configured to allow a high-pressure fluid line to span between structural components that move relative to each other without being required to use flexible hose. In FIG. 1a, an emergency inflatable assembly, such as a life raft pod 14, is shown installed on an aircraft compartment door 12. The emergency inflatable assembly utilizes hose hinge assembly 10 to provide fluid coupling to a remote pressurized fluid source.

Life raft pod 14 generally includes a housing 2 that is configured to contain a life raft (not shown) in a deflated configuration. Housing 2 includes an external door (not shown) that encloses the life raft in housing 2 when the life raft is not needed. Life raft pod 14 is coupled to compartment door 12 so that pod 14 is maintained within the compartment but is easily accessible by opening compartment door 12. Life raft pod 14 extends through compartment door 12 so that the external door is exposed and able to open independent of compartment door 12.

A pair of pressure actuated latches 4 retain the external door in a closed position during normal storage conditions. Latches 4 are configured to release the door when high pressure gas is released into a high pressure line that extends to the life raft. Each latch 4 is configured so that when high pressure fluid is injected into an inlet 5 of latch 4 it causes a pin 6 to translate within latch 4 to release the external door of pod 14. The translation of pin 6 opens an outlet 7 of latch 4 which allows the pressurized gas to exit latch 4 and continue to travel toward the inflatable device. In the present embodiment, latches 4 are coupled in series by sections of a raft fill line 34 so that upon release of the pressurized gas from the fluid reservoir, the gas flows sequentially into the two latches 4. It should be appreciated, however, that more or fewer latches 4 may be incorporated and they may be coupled either in series (as shown) or parallel as desired.

Figure 1B:
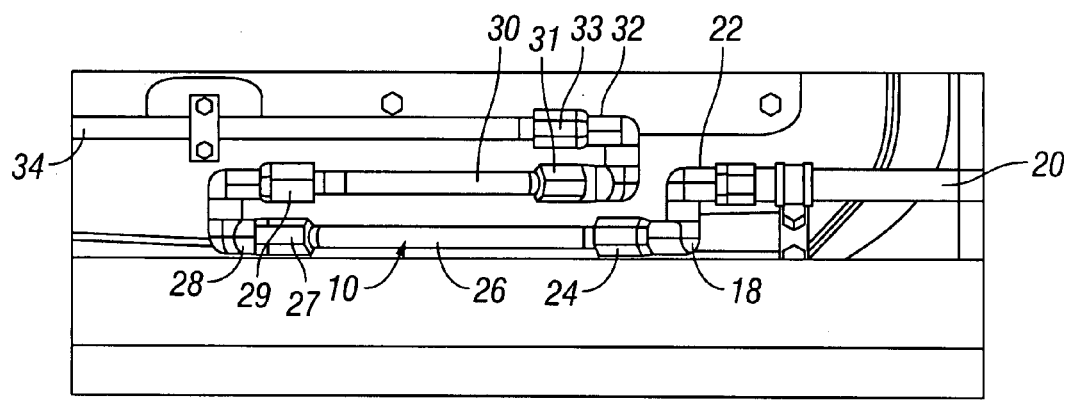
FIG. 1b is an enlarged view of an embodiment of the hose hinge assembly shown in FIG. 1a in a closed configuration.

Referring now to FIG. 1b, an enlarged view of hose hinge assembly 10 is shown. Hose hinge assembly 10 includes a plurality of rigid pipe sections 26, 30 coupled by swivel fittings 18, 28, 32 so that rigid pipe sections 26, 30 may be moved relative to each other to allow compartment door 12 to function while the fluid path remains intact. Because the function of compartment door 12 is maintained, it allows installation of life raft pod 14 on compartment door 12 while allowing the compartment to be used simultaneously for other purposes, such as to stow baggage.

In the present embodiment, hose hinge assembly 10 is generally configured so that the rigid pipe sections, compartment door 12 and the aircraft body form links of a 4-bar linkage. Such a configuration is particularly advantageous where an axis of rotation of a rotating joint between the rigid pipe sections cannot be located coincident with an axis of rotation between the compartment door 12 and the aircraft body. The swivel fittings as well as rigid pipe sections are preferably made of high strength stainless steel but any material sufficient for high pressure fluid may be used.

According to the illustrated embodiment, a high pressure feed line 20 that is coupled to a pressurized fluid reservoir extends into the compartment to a first end 22 of a first swivel fitting 18. A second end 24 of swivel fitting 18 is connected to one end of a rigid pipe section 26. The other end of rigid pipe section 26 is connected to a first end 27 of a second swivel fitting 28. A second end 29 of fitting 28 is connected to a rigid pipe section 30. The other end of rigid pipe section 30 is connected to a first end 31 of a third swivel fitting 32. A second end 33 of fitting 32 is connected to a high pressure fill line 34 connected to compartment door 12.

Figure 1C:
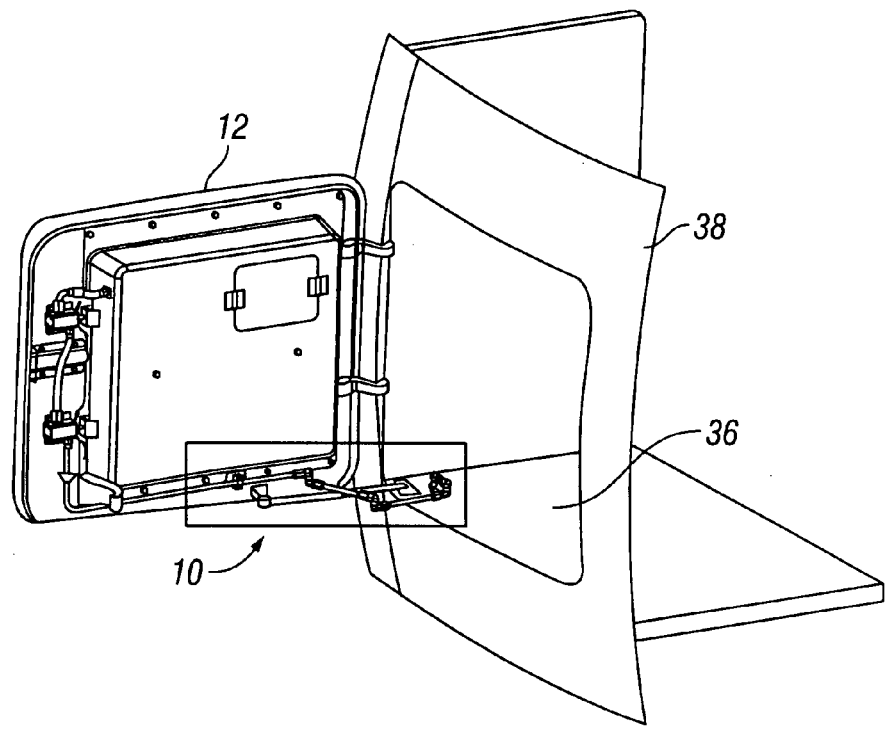
FIG. 1c is a perspective view of the compartment door of FIG. 1a in an open position.
Figure 1D:
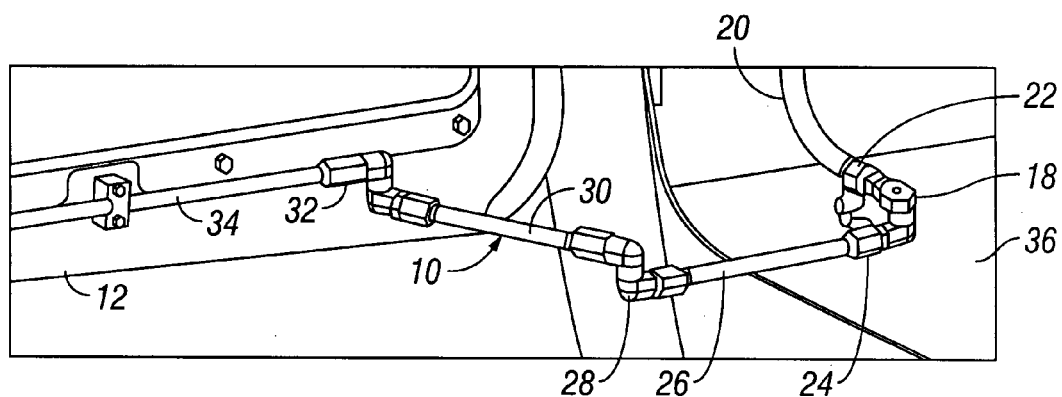
FIG. 1d is an enlarged view of the embodiment of the hose hinge assembly shown in FIG. 1c in an open configuration.

Feed line 20 is fixedly coupled to the aircraft body and first end 22 of swivel 18 is preferably fixably attached to an interior panel of the aircraft so that it is close to the rotational axis of compartment door 12. As is shown in FIGS. 1c and 1d, fitting 18 is connected to floor 36 of the compartment. Likewise, second end 33 of swivel fitting 32 is fixedly attached to door 12 through raft fill line 34. Raft fill line 34 is preferably a rigid pipe that is attached to the door 12. Alternatively, second end 33 of swivel fitting 32 may be directly coupled to compartment door 12 if desired.

Swivel fitting 28 couples first and second rigid pipe sections 26, 30 and is not directly coupled to either compartment door 12 or the compartment. Swivel fitting 28 is generally suspended between compartment door 12 and the compartment throughout operation of hose hinge assembly 10 as will be described in greater detail below. Compartment door 12 can be opened as the combination of swivels and hard lines accommodate the movement of the door relative to the aircraft 38.

During operation, second swivel fitting 28 connecting the two rigid pipe sections 26, 30 allows rigid pipe sections 26, 30 to move relative to the other while the swivel fittings on the ends of hose hinge assembly 10 allow each hose to pivot around the fixed points they are attached to (e.g., the baggage compartment floor and the baggage door). In the closed configuration, shown in FIGS. 1a and 1b, rigid pipe sections are generally adjacent to each other and oriented parallel or at a small acute angle relative to each other, e.g., 0-15 degrees. When the door is opened, as shown in FIGS. 1c and 1d, swivel fittings 18, 28, 32 rotate and allow the door to complete its full range of travel while feed line 20 is fixed to the compartment and raft fill line 34 is fixed to compartment door 12. During inflation hose hinge assembly 10 acts as a normal high pressure conduit allowing gas to flow from the reservoir to the life raft in life raft pod 14.

Figure 2:
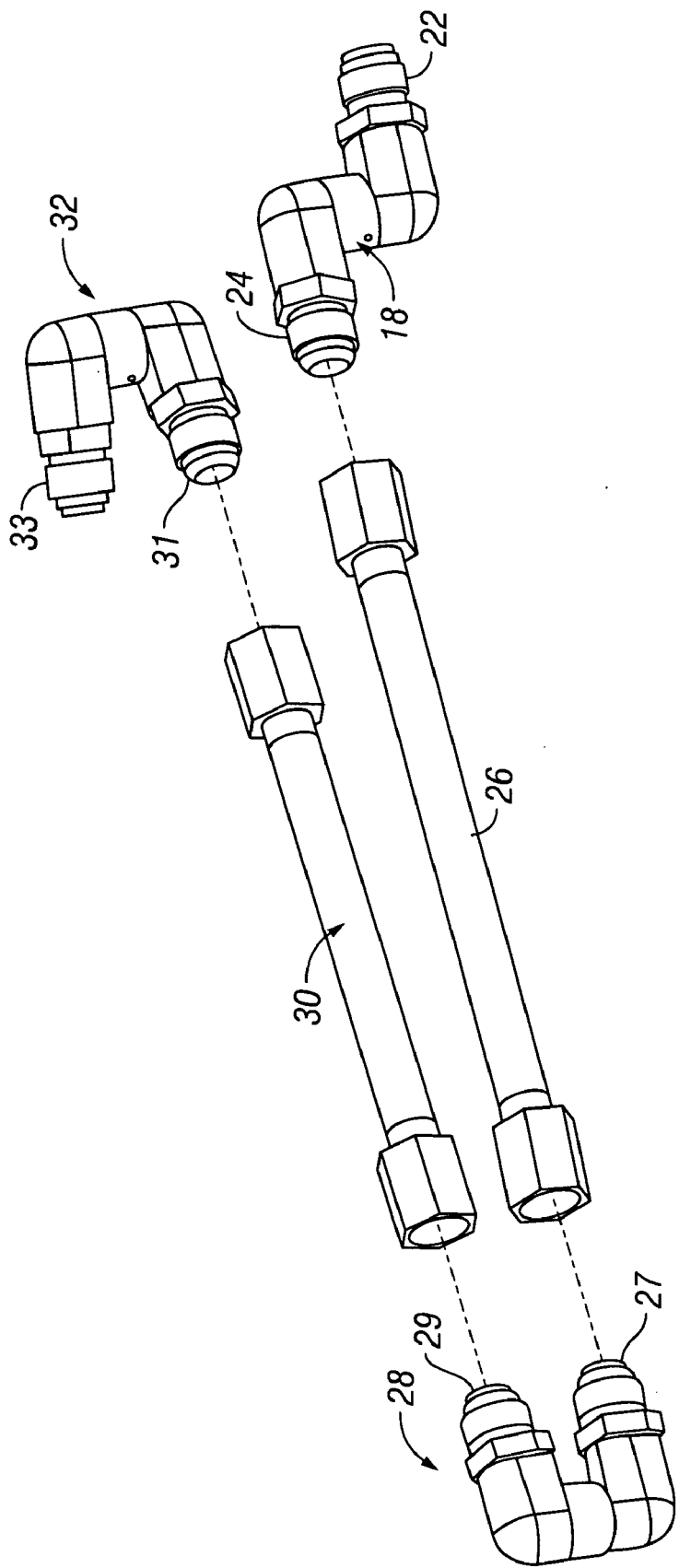
FIG. 2 is an exploded view of an embodiment of the hose hinge assembly.
Figure 3:
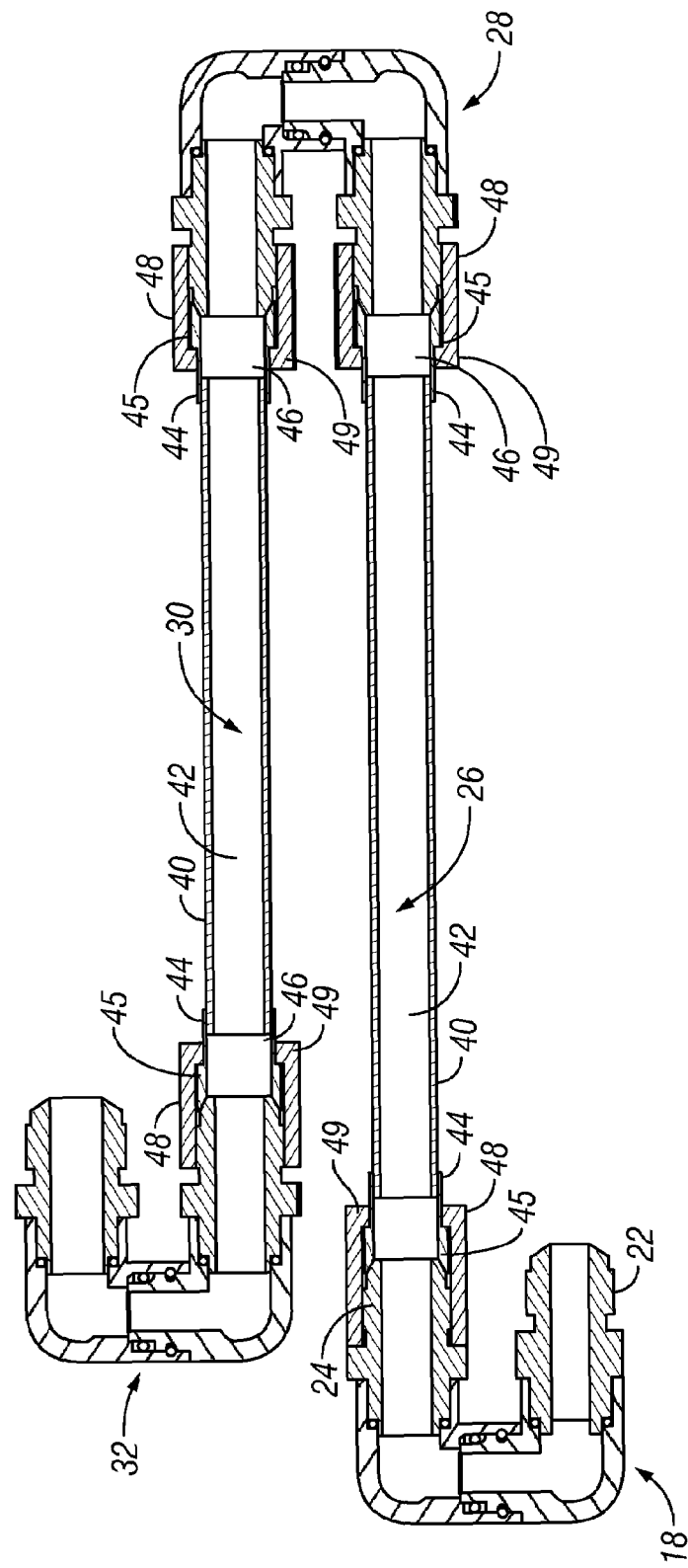
FIG. 3 is a cross-sectional view of an embodiment of the hose hinge assembly.

Referring to FIGS. 2-3, the construction of hose hinge assembly 10 will be described in detail. As described above, hose hinge assembly 10 generally includes three swivel fittings 18, 28, 32 separated by two rigid pipe sections 26, 30. Each rigid pipe section 26, 30 includes an elongate body member 40 that has a central lumen 42. Tips 44 are fixedly coupled to each end of body member 40 and tips 44 include lumens 46 that generally align with lumen 42 so that each pipe section 26, 30 includes a continuous fluid path therethrough.

A compression nut 48 is also included on each end of rigid section 26, 30. Compression nut 48 is generally tubular and includes a flange 49 at one end. Flange 49 is included so that compression nut 48 is maintained on rigid pipe section 26, 30 by a shoulder 45 of tip 44. Compression nut 48 is free to rotate about tip 44 and body member 40 and to translate in the direction of the longitudinal axis of body member 40. Preferably, the interior of compression nut 48 is threaded to engage a threaded outer surface included on swivel fittings 18, 28, 32.

Figure 4:
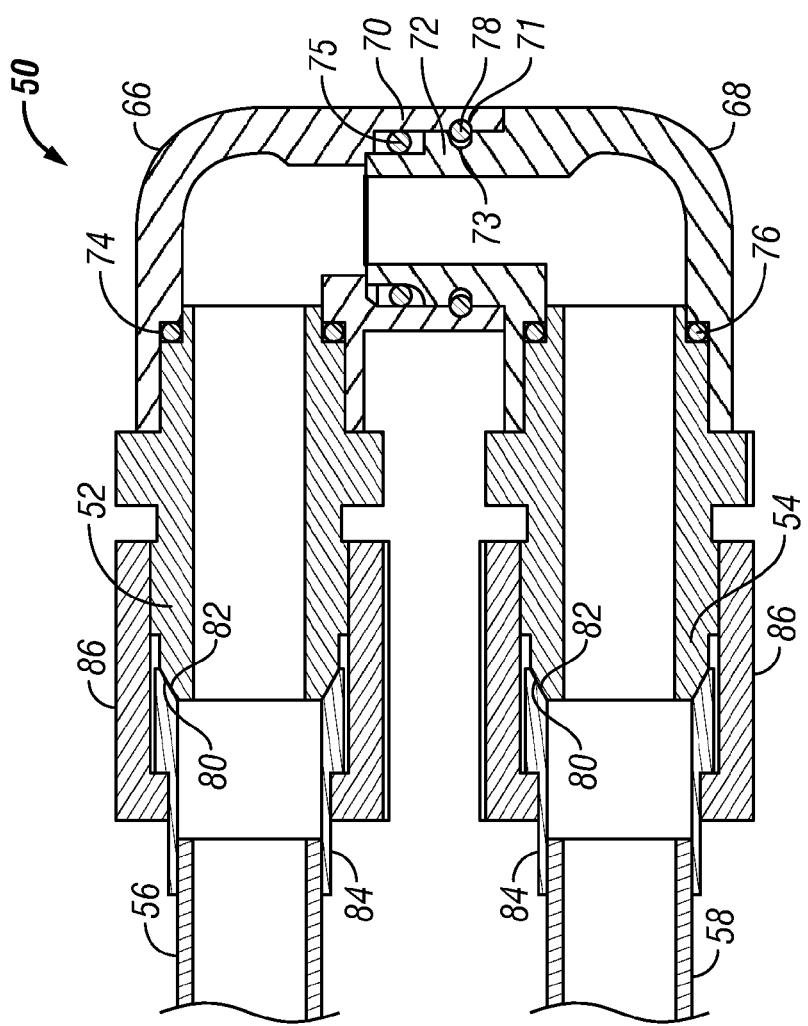
FIG. 4 is a cross-sectional view of a swivel fitting that may be used in the hose hinge assembly.

Referring now to FIG. 4, a preferred embodiment of a swivel fitting 50 will be described. Fitting 50 generally includes a first end piece 52, a first elbow 66, a second elbow 68 and a second end piece 54. First end piece 52 is coupled to first elbow 66 with a sealing member, such as o-ring 74 interposed therebetween. First end piece 52 may be threaded, welded, soldered or coupled in any other way known in the art to first elbow 66 so that first end piece 52 is sealed with elbow 66. As shown, each of first and second elbows 66, 68 are 90-degree elbows but it should be appreciated that the elbows may have any angular configuration desired.

First elbow 66 is coupled to second elbow 68 at an end opposite first end piece 52. The parts are coupled so that they may be rotated relative to each other while remaining fluidly sealed. In particular, first elbow 66 includes an end 70 that is configured to receive an end 72 of second elbow 68. An o-ring 75 is interposed between end 70 and end 72 to provide a fluid seal between elbows 66, 68. End 70 also includes an interior circumferential channel 71 that is aligned with an exterior circumferential channel 73 on end 72. A retaining ring 78 is disposed in channels 71, 73 and prevents translation of elbow 66 away from elbow 68 while allowing the two elbows to rotate relative to each other. Use of an internal retaining ring is described in U.S. Pat. No. 6,709,019 which is hereby incorporated by reference.

Second end piece 54 is coupled to second elbow 68 at an end opposite first elbow 66. An o-ring 76 is interposed between second end piece 54 and second elbow 68 to provide a fluid seal between the parts. Second end piece 54 may be threaded, welded, soldered or coupled in any other way known in the art to second elbow 68 so that second end piece 54 is sealed with elbow 68.

In an assembled hose hinge assembly, first end piece 52 is connected to an in-flow pipe 56 and second end piece 54 is connected to an out-flow pipe 58. First and second end pieces 52, 54 include contact surfaces 80 that are generally oriented to mate with complimentary contact surfaces 82 on tips 84 of in-flow pipe 56 and out-flow pipe 58. Compression nuts 86 on each pipe 56, 58 thread onto end pieces 52, 54. The threaded engagement pulls each pipe 56, 58 toward a respective end piece 52, 54 to thereby force contact surfaces 80 of end pieces 52, 54 into compression with contact surfaces 82. It should be appreciated that the configurations of contact surfaces 80, 82 are selected to provide sealing contact between the surfaces. Those skilled in the art will appreciate that additional methods of providing high pressure connections can be used in place of the compression nut connection shown in FIG. 4 without departing from the present invention.

It should be appreciated that additional rigid pipe sections and swivel fittings may be included if desired. For example, two additional rigid pipe sections and swivel fittings may be included so that the hose hinge assembly generally forms a 6-bar linkage in combination with the components that move relative to each other (e.g., an aircraft compartment and a compartment door). The number of rigid pipe sections and swivel fittings may be selected so that the various sections may be configured to move in any desired way.

Furthermore, it should be appreciated that the illustrated swivel fittings are provided as examples rather than to limit the present invention. In fact, any rotating pipe coupling may be used that is sufficient to couple high pressure fluid lines.

One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

What is claimed is:

1. A hose hinge assembly for an emergency flotation system, comprising:
 a first swivel fitting including a pair of elbow components rotatably coupled to each other;
 a second swivel fitting including a pair of elbow components rotatably coupled to each other;

a third swivel fitting including a pair of elbow components rotatably coupled to each other;

a feed line extending into a compartment located in the interior of an aircraft body, the compartment having a compartment door;

a fill line for an emergency flotation system, the fill line connected to the compartment door;

a first rigid line; and a second rigid line;

wherein a first end of the first swivel fitting is connected to the feed line, a second end of the first swivel fitting is connected to the first end of the first rigid line and the second swivel fitting is connected to the second end of the first rigid line, and wherein the second rigid line is connected at its first end to the second swivel fitting and is connected at its second end to a first end of the third swivel fitting, and a second end of the third swivel fitting is connected to the fill line such that the feed line, the first swivel fitting, the first rigid line, the second swivel fitting, the second rigid line, the third swivel fitting, and the fill line are connected in series and provide a fluid path from the feed line to the fill line and the fluid path remains intact when any one or more of the feed line, fill line, first rigid line and second rigid line are moved relative to each other.

2. The hose hinge assembly of claim 1, wherein each elbow component is a 90-degree elbow component.

3. The hose hinge assembly of claim 1, wherein an o-ring provides a fluid seal between the elbow components.

4. The hose hinge assembly of claim 1, wherein an end piece is coupled to each elbow component.

5. The hose hinge assembly of claim 4, wherein an o-ring provides a fluid seal between each end piece and each elbow component.

6. The hose hinge assembly of claim 4, wherein each end piece includes a contact surface configured to abut a contact surface of a rigid line when the line is coupled to the swivel fitting.

7. The hose hinge assembly of claim 1, wherein each rigid line is coupled to a swivel fitting with a compression nut.

8. The hose hinge assembly of claim 1 wherein the rigid lines, the compartment door and the aircraft body form a 4-bar linkage.

9. The hose hinge assembly of claim 1 wherein the feed line is coupled to the aircraft body.

10. The hose hinge assembly of claim 1 wherein the first end of the first swivel fitting is attached to an interior panel of the aircraft such that it is close to the rotational axis of the compartment door.

11. A hose hinge assembly for an emergency floatation device, comprising:

a plurality of swivel fittings, each swivel fitting including a pair of elbow components rotatably coupled to each other;

a plurality of rigid pipe sections;

a feed line extending into a compartment located in the interior of an aircraft body, the compartment having a compartment door; and a fill line for the emergency flotation system connected to the compartment door;

wherein an inlet of a swivel fitting is coupled to the feed line, an outlet of another swivel fitting is coupled to the fill line and the rigid pipe sections extend between the swivel fittings coupled to the feed line and the fill line with at least one additional swivel fitting interposed between the rigid pipe sections such that a high-pressure fluid path is formed and the high-pressure fluid path remains intact when the compartment door is moved relative to the compartment.

12. The hose hinge assembly of claim 11, wherein the at least one additional swivel fitting is suspended between the two swivel fittings coupled to the first and second components by the two rigid pipe sections.

13. The hose hinge assembly of claim 11, wherein an o-ring provides a fluid seal between the elbow components.

14. The hose hinge assembly of claim 11, wherein each rigid pipe section is coupled to a swivel fitting with a compression nut.

15. The hose hinge assembly of claim 1 wherein the rigid lines are made of stainless steel.

* * * * *